United States Patent
Hirakawa

(10) Patent No.: US 9,210,279 B2
(45) Date of Patent: Dec. 8, 2015

(54) IMAGE FORMING APPARATUS AND METHOD FOR CONTROLLING IMAGE FORMING APPARATUS

(75) Inventor: Satoshi Hirakawa, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 745 days.

(21) Appl. No.: 13/598,319

(22) Filed: Aug. 29, 2012

(65) Prior Publication Data

US 2013/0057911 A1    Mar. 7, 2013

(30) Foreign Application Priority Data

Sep. 2, 2011   (JP) .................................. 2011-191187

(51) Int. Cl.
G06F 15/167   (2006.01)
H04N 1/00   (2006.01)

(52) U.S. Cl.
CPC ....... H04N 1/00342 (2013.01); H04N 1/00891 (2013.01); H04N 1/00896 (2013.01); H04N 1/00901 (2013.01); H04N 1/00962 (2013.01); H04N 2201/0094 (2013.01)

(58) Field of Classification Search
USPC .................. 709/203, 213, 216; 711/104, 115; 713/1, 2, 320; 714/54
See application file for complete search history.

(56) References Cited

U.S. PATENT DOCUMENTS

| | | | | |
|---|---|---|---|---|
| 6,401,198 B1* | 6/2002 | Harmer et al. | | 713/1 |
| 7,039,759 B2* | 5/2006 | Cheng et al. | | 711/115 |
| 7,818,556 B2* | 10/2010 | Iima et al. | | 713/1 |
| 8,321,702 B2* | 11/2012 | Kaneko et al. | | 713/320 |
| 8,352,807 B2* | 1/2013 | Yamashita et al. | | 714/54 |
| 8,421,882 B2* | 4/2013 | Ueda et al. | | 348/229.1 |
| 2008/0052453 A1* | 2/2008 | Cheng | | 711/104 |
| 2008/0126784 A1* | 5/2008 | Iima et al. | | 713/2 |
| 2010/0079782 A1* | 4/2010 | Tsuya et al. | | 358/1.13 |
| 2011/0205581 A1 | 8/2011 | Machii | | |
| 2012/0084802 A1* | 4/2012 | Kitazato | | 725/14 |

FOREIGN PATENT DOCUMENTS

| | | |
|---|---|---|
| CN | 1963792 A | 5/2007 |
| JP | 2006-005633 A | 1/2006 |
| JP | 2006-095739 A | 4/2006 |
| JP | 2006-121203 A | 5/2006 |
| JP | 2009-300544 A | 12/2009 |

* cited by examiner

Primary Examiner — Quang N Nguyen
(74) Attorney, Agent, or Firm — Canon U.S.A., Inc. IP Division

(57) ABSTRACT

An image forming apparatus includes a storage unit that is accessible from an external device even if the image forming apparatus is in a power off state, a setting unit configured that sets information on an installation status of the image forming apparatus, and a control unit that, according to the information on the installation status set by the setting unit, enables writing, in the storage unit, of information corresponding to the information on the installation status from information used by the image forming apparatus at a plurality of timing points.

12 Claims, 13 Drawing Sheets

FIG. 5A

| Bit Flag | Access rights for I2c |
|----------|----------------------|
| 0        | Write                |
| 1        | No Write             |

FIG. 5B

| Bit Flag | Sector 0 | Sector 1 | Sector 2 | Sector 3 | Sector 4 | Sector 5 | Sector 6 | ... | Sector X |
|---|---|---|---|---|---|---|---|---|---|
| | 1 | 1 | 0 | 0 | 0 | 0 | 0 | ... | 0 |

FIG. 6A

| Bit Flag | Access rights for RF | |
|---|---|---|
| 00 | Read | Write |
| 01 | Read | No Write |
| 10 | No Read | Write |
| 11 | No Read | No Write |

FIG. 6B

| Bit Flag | Sector 0 | Sector 1 | Sector 2 | Sector 3 | Sector 4 | Sector 5 | Sector 6 | ... | Sector X |
|---|---|---|---|---|---|---|---|---|---|
| | 11 | 11 | 11 | 11 | 01 | 10 | 00 | ... | 00 |

IMAGE FORMING APPARATUS AND METHOD FOR CONTROLLING IMAGE FORMING APPARATUS

BACKGROUND OF THE INVENTION

1. Field of the Invention

Aspects of the present invention relate to a technique for configuring settings for an image forming apparatus.

2. Description of the Related Art

Image forming apparatuses include a storage medium such as a hard disk or a memory for storing various types of information used for setting operations and managing apparatus states. The information includes, for example, an operation log of the image forming apparatus, setting information on the main body, user information such as an address book, counter data, and license information. The image forming apparatus configures the operation settings and manages the state by writing such information in the storage medium and reading it out. However, writing information in the storage medium and reading it out is not sufficient under various conditions.

For example, an image forming apparatus discussed in Japanese Patent Application Laid-Open No. 2006-95739 generates information on a job which is executed when an error occurs with the image forming apparatus and an operating state is changed from the operation state to a power saving state. Information necessary for the apparatus to recover the operating state is also generated. If the content of the error is such that the apparatus can be recovered without disconnecting power, the image forming apparatus changes the state to the power saving state and uses a volatile storage unit. If the content of the error is such that the apparatus needs to be powered off before the recovery operation, the image forming apparatus changes the state to the power saving state and uses a non-volatile storage unit.

In this manner, the image forming apparatus discussed in Japanese Patent Application Laid-Open No. 2006-95739 changes the storage medium for storing information according to the content of the error so that the information can be appropriately stored in the storage medium.

However, changing the storage medium depending on the content of the error by the technique described above is insufficient when the information on the image forming apparatus needs to be stored in a storage medium under various situations.

For example, although information to be stored in a storage medium of an image forming apparatus is different depending on the situation of the image forming apparatus (e.g., before/after installation in the client environment), according to the conventional image forming apparatus, information corresponding to various situations of the image forming apparatus is not appropriately stored in the storage medium. Accordingly, such information is not utilized.

SUMMARY OF THE INVENTION

One aspect of the present invention is directed to storing information in an image forming apparatus that is accessible even if the image forming apparatus is powered off, acquiring apparatus information from the image forming apparatus in the power-off state, and transferring setting information to the image forming apparatus in the power-off state.

According to an aspect of the present invention, an image forming apparatus includes a storage unit configured to be accessible from an external device even if the image forming apparatus is in a power-off state, a setting unit configured to set information on an installation status of the image forming apparatus, and a control unit configured to, according to the information on the installation status set by the setting unit, enable writing, in the storage unit, of information corresponding to the information on the installation status from information used by the image forming apparatus at a plurality of timing points.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A and 5B each illustrate an example of a bit flag indicating a memory access right regarding access to the dual I/F memory via an Inter-Integrated Circuit (I2C) interface.

FIGS. 6A and 6B each illustrate an example of a bit flag indicating a memory access right regarding access to the dual I/F memory via a radio frequency (RF) interface.

DESCRIPTION OF THE EMBODIMENTS

Various exemplary embodiments, features, and aspects of the invention will be described in detail below with reference to the drawings.

Figure 1:
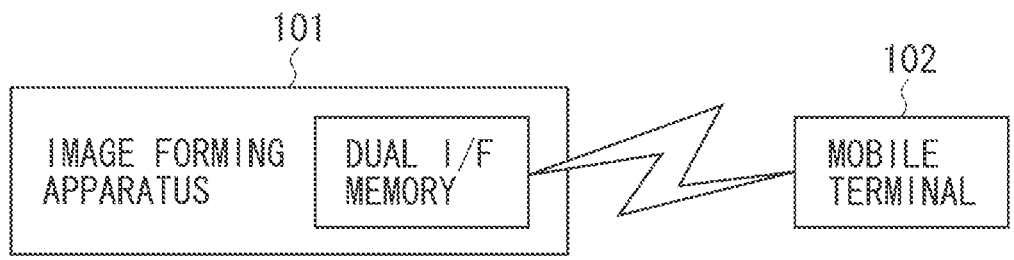
FIG. 1 is a block diagram illustrating a configuration example of a system to which an image forming apparatus according to an exemplary embodiment can be applied.

FIG. 1 is a block diagram illustrating a configuration example of a system to which an image forming apparatus according to an exemplary embodiment can be applied.

An image forming apparatus 101 is used and managed by a user, an administrator, or a service engineer. The image forming apparatus 101 includes, for example, a multifunction peripheral (MFP). A mobile terminal 102 serves as an information processing apparatus managed by the user, the administrator, or the service engineer.

Each of the image forming apparatus 101 and the mobile terminal 102 includes a Radio Frequency Identification (RFID) interface. According to this interface, contactless transmission/reception of data between the image forming apparatus 101 and the mobile terminal 102 is realized regardless of the power state of the image forming apparatus 101. The image forming apparatus 101 will be described in detail below.

Figure 2:
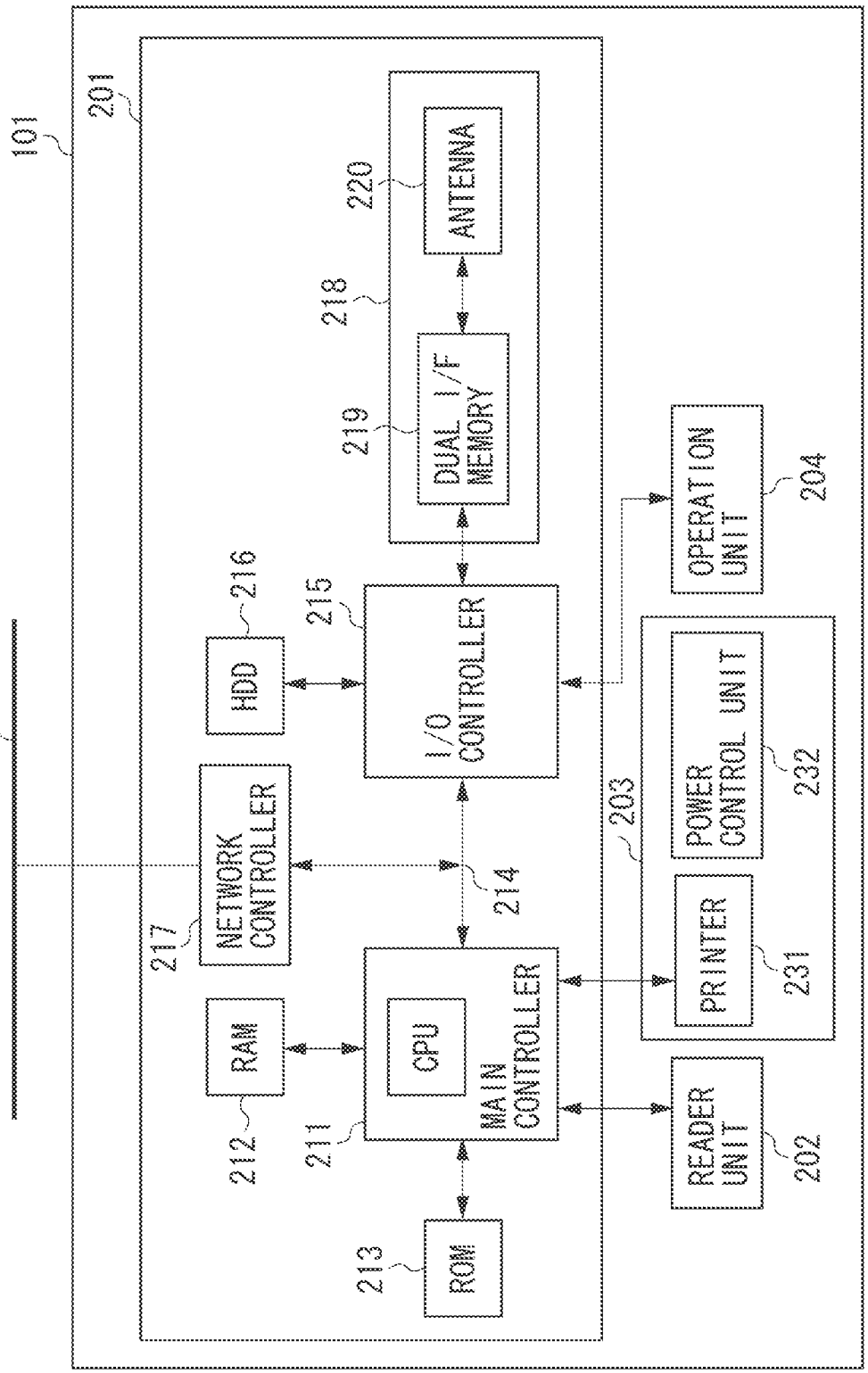
FIG. 2 is a block diagram illustrating a configuration example of the image forming apparatus.

FIG. 2 is a block diagram illustrating a configuration example of the image forming apparatus 101.

As illustrated in FIG. 2, the image forming apparatus 101 includes four units: a controller unit 201, a reader unit 202, a printer unit 203, and an operation unit 204. The controller unit 201 is connected to the reader unit 202, which is an image input unit, and the printer unit 203, which is an image output unit. Further, the controller unit 201 is connected to the operation unit 204. When the controller unit 201 detects an instruction input by the user via the operation unit 204, the controller unit 201 performs various types of processing.

A main controller 211, which is included in the controller unit 201, is a controller IC and controls the entire system. The main controller 211 includes a central processing unit (CPU) core and an image processing block. A random access memory (RAM) 212 is a system work memory that is used when the main controller 211 controls the system. The RAM 212 is also an image memory that temporarily stores image data. A read-only memory (ROM) 213 is a boot ROM and stores a boot program of the system.

A system bus 214 includes, for example, a peripheral component interconnect (PCI) bus. High speed transmission/reception of communication data and image data is realized by the system bus 214. The main controller 211 is connected to an input/output (I/O) controller 215 and a network controller 217 via the system bus 214.

The network controller 217 is connected to an external network, regardless of whether the network is wired or wireless, and performs communication. The I/O controller 215 controls various I/O devices. The main controller 211 accesses a hard disk drive (HDD) 216, the operation unit 204, and a dual interface (I/F) memory unit 218 via the I/O controller 215.

The HDD 216 is a large-capacity hard disk drive and stores system software, the image data, system management data, and box management data. The operation unit 204 includes a display unit and displays data via the I/O controller 215. Further, the operation unit 204 accepts various settings and operations of the image forming apparatus 101 set and performed by the user. When a key operation is detected, the operation unit 204 notifies the main controller 211 of the content of the operation. The main controller 211 changes the display of the screen and executes processing according to the content of the operation notified by the operation unit 204.

The dual I/F memory unit 218 includes the dual I/F memory 219 and a RFID antenna (hereinafter, referred to as an antenna) 220. The dual I/F memory 219 includes two interfaces, an I2C bus and a RFID interface. Writing and reading of data can be performed via both interfaces. The I2C bus is a serial bus developed by Royal Philips Electronics. The two interfaces of the dual I/F memory 219 are not limited to the I2C bus and the RFID and other interfaces can be used so long as similar internal access to the dual I/F memory 219 and access from an external device can be realized.

The dual I/F memory 219 can be accessed from the I/O controller 215 via the I2C bus and from an external device by RFID via the antenna 220.

The dual I/F memory 219 includes a control function regarding power and communication. According to that control function, even if power is not internally supplied to the image forming apparatus 101, the dual I/F memory 219 accepts access from the external device according to the power collected by the antenna 220.

The printer unit 203 includes a printer 231 and a power control unit 232. The power control unit 232 performs power control of the entire image forming apparatus 101. The power control unit 232 performs detailed power control according to an instruction from the main controller 211.

Figure 3:
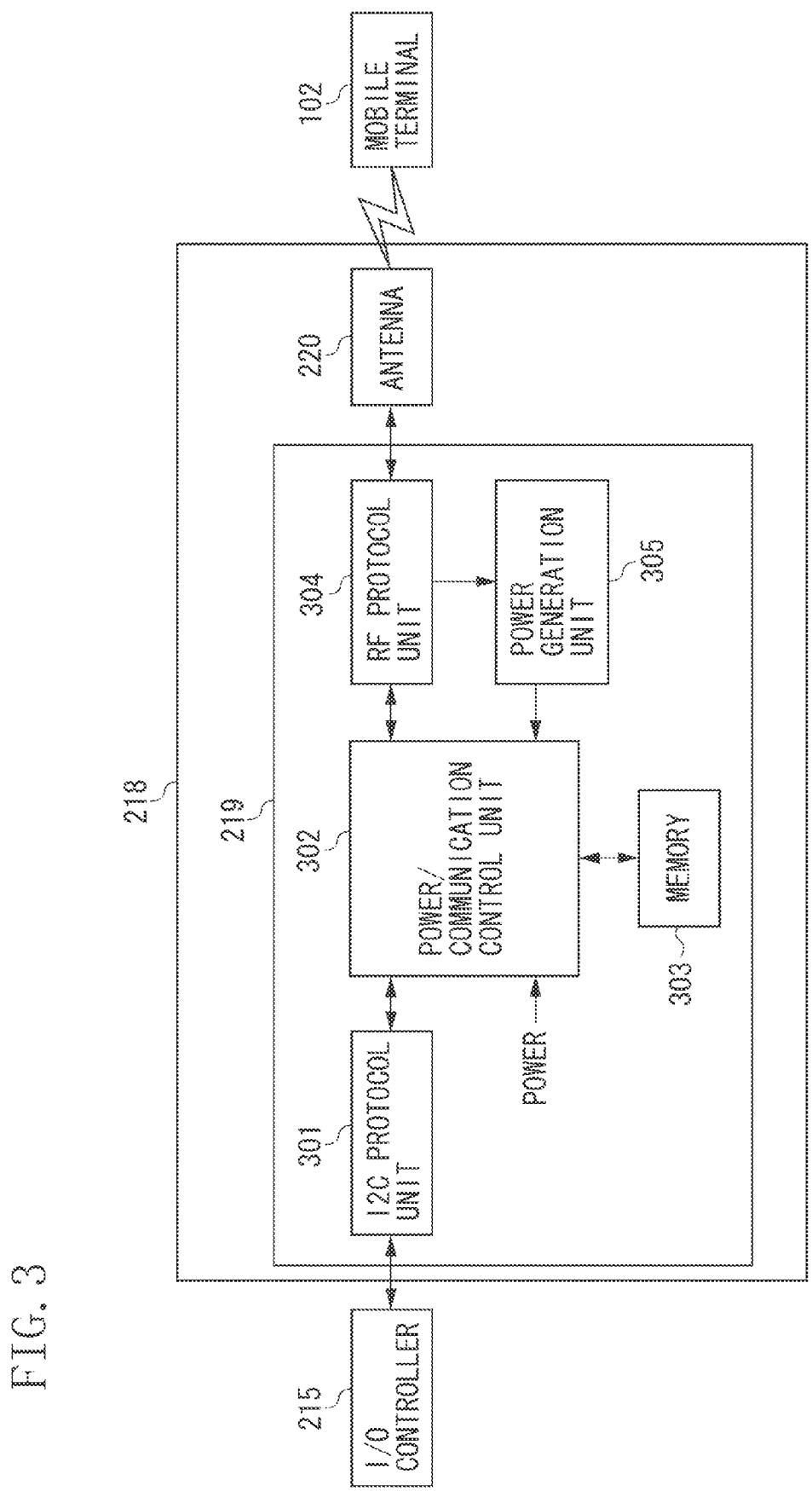
FIG. 3 is a block diagram illustrating a configuration example of a dual interface (I/F) memory unit.

FIG. 3 is a block diagram illustrating a configuration example of the dual I/F memory unit 218.

The dual I/F memory 219 includes two interfaces, the I2C bus and the RFID (passive RFID) interface. Reading and writing of data is enabled via both interfaces. The mobile terminal 102 illustrated in FIG. 1 includes an active RFID interface.

The I2C bus from the I/O controller 215 is connected to an I2C protocol unit 301. When the I2C protocol unit 301 receives data output from the I/O controller 215, the I2C protocol unit 301 converts the data in the I2C protocol into internal access data, and transmits the obtained data to a power/communication control unit 302.

Communication data output from the mobile terminal 102, which includes the active RFID interface, is transmitted to the power/communication control unit 302 via a RF protocol unit 304 connected to the antenna 220 (RFID antenna). A power generation unit 305 collects energy from the induction field generated at the antenna 220, and supplies power to the power/communication control unit 302.

The power/communication control unit 302 performs arbitration processing of the power and communication input via the I2C interface and the passive RFID interface. According to this arbitration processing, contention between power supply/access from both interfaces can be avoided when reading and writing processing is performed.

Further, the power/communication control unit 302 has a password block function. If the communication is not based on a predetermined communication protocol, access to a memory 303 is blocked. In this manner, memory data is protected. The memory 303 includes a non-volatile memory such as an electrically erasable programmable read-only memory (EEPROM).

According to the above-described configuration, the dual I/F memory 219 can be accessed from the external device even if the mode of the image forming apparatus 101 is changed to the power saving mode and the power supplied via the I2C interface is stopped. This is because power can be collected from the induction field at the antenna 220. Thus, the dual I/F memory 219 is a storage unit that can be accessed by an external device, such as the mobile terminal 102, by wireless communication even if the image forming apparatus 101 is powered off. Further, the memory 303 of the dual I/F memory 219 can be divided into blocks according to the application. Access right via the I2C interface and the RFID interface can be set for each block.

Next, access right setting regarding access via the I2C interface and the RFID interface will be described with reference to FIGS. 4, 5A, 5B, 6A, and 6B.

Figure 4:
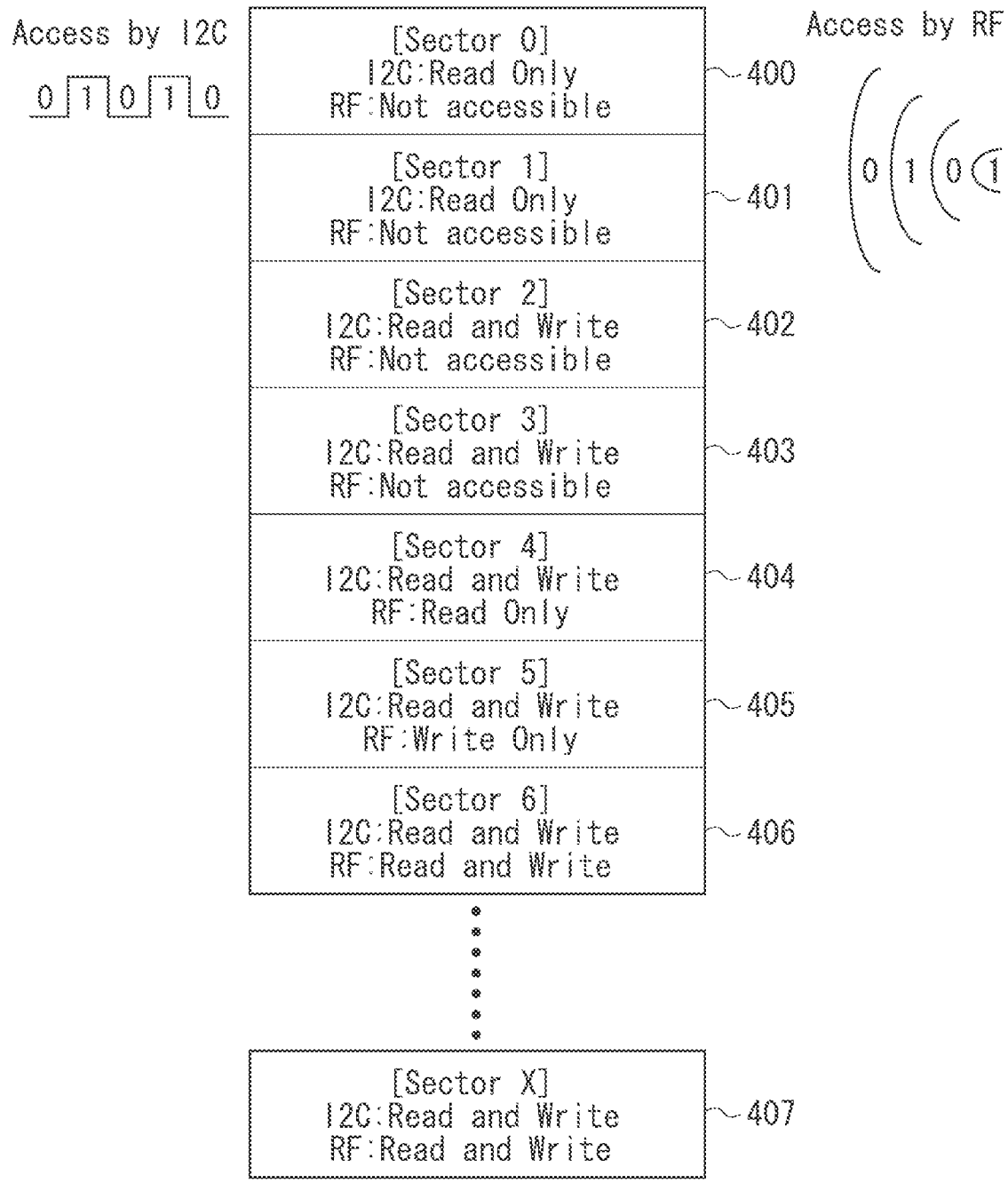
FIG. 4 illustrates an example of access right setting in each sector of a dual I/F memory.

FIG. 4 illustrates an example of a case where the dual I/F memory 219 is divided into blocks and the access right is set for each block. In FIG. 4, each of the blocks (referred to as (sector 0) 400, (sector 1) 401, . . . , (sector X) 407) represents a sector. Each sector is a storage area where the information in the dual I/F memory 219 is stored.

Access right settings regarding access via the I2C and via the RF interfaces can be individually set for each sector. The setting of each sector will be described with reference to FIG. 4. In FIG. 4, (Sector 0) 400 is set to "Read Only" for the I2C and "Not accessible" for the RF. The "Read Only" indicates that only reading is enabled regarding the memory access via the I2C. The "Not accessible" indicates that reading and writing are disabled regarding the memory access via the RF.

Further, (sector 6) 406 is set to "Read and Write" for both the I2C and the RF. The "Read and Write" for the I2C indicates that both reading and writing are enabled regarding the memory access via the I2C. The "Read and Write" for the RF indicates that both reading and writing are enabled regarding the memory access via the RF.

As described above, the access right setting regarding the memory access via the I2C and the RF can be individually set for each sector. Next, individual setting of the memory access right for each sector will be described with reference to FIGS. 5A, 5B, 6A, and 6B.

FIGS. 5A and 5B each illustrate an example of a bit flag indicating the memory access right regarding access to the dual I/F memory 219 via the I2C. FIGS. 6A and 6B each illustrate an example of a bit flag indicating the memory access right regarding access to the dual I/F memory 219 via the RF.

FIG. 5A illustrates a value of a bit flag indicating the memory access right via the I2C. If the bit flag is "0", it indicates that writing is enabled. If the bit flag is "1", it indicates that writing is disabled. Reading via the I2C is always enabled regardless of the value of the bit flag.

As illustrated in FIG. 5B, the bit flag is stored in the memory 303 as communication control information for each sector. If the memory access is performed via the I2C, the power/communication control unit 302 references the above-described bit flag stored in the memory 303 and controls the reading and the writing processing with respect to the memory 303.

FIG. 6A illustrates a value of a bit flag indicating the memory access right via the RF. If the bit flag is "00", it indicates that both reading and writing are enabled. If the bit flag is "11", it indicates that both reading and writing are disabled. Reading via the I2C is always enabled regardless of the value of the bit flag. Further, if the bit flag is "01", it indicates that reading is enabled but writing is disabled. If the bit flag is "10", it indicates that reading is disabled but writing is enabled.

As illustrated in FIG. 6B, the bit flag is stored in the memory 303 as communication control information for each sector. As is the case with the I2C, if memory access is performed via the RF, the power/communication control unit 302 references the above-described bit flag stored in the memory 303 and controls the reading and the writing operations with respect to the memory 303.

The bit flags illustrated in FIGS. 5B and 6B described above are stored in an area other than the memory area where actual data of the memory 303 is stored. The bit flags are stored as information which can be accessed only by the power/communication control unit 302.

Figure 7:
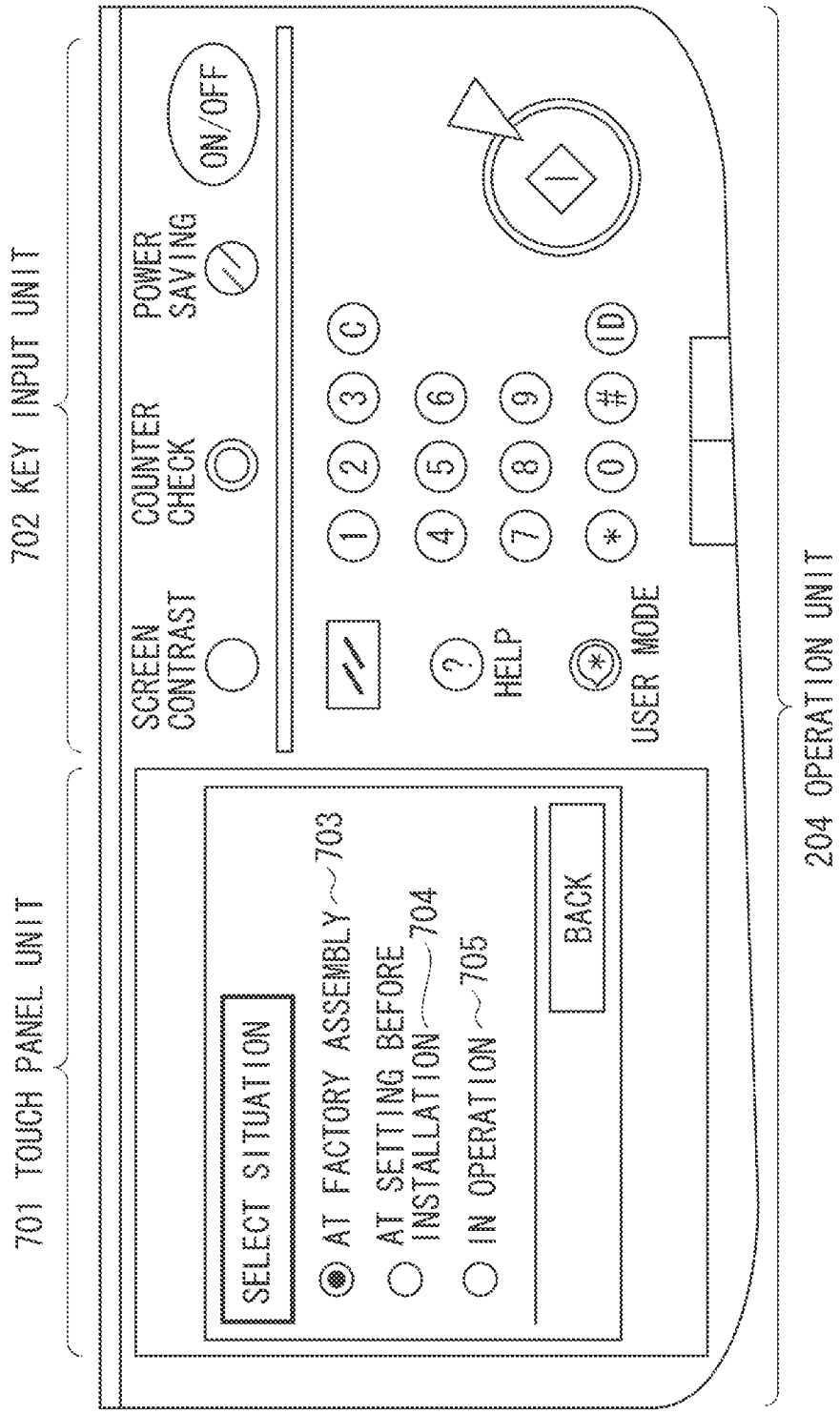
FIG. 7 illustrates an example of a situation selection screen displayed on an operation unit.

Next, settings of the memory access right for each situation will be described. FIG. 7 illustrates an example of a situation selection screen displayed on the operation unit 204. As illustrated in FIG. 7, the operation unit 204 includes a touch panel unit 701 and a key input unit 702.

The operation unit 204 displays a situation selection screen, such as the one illustrated in FIG. 7, on the touch panel unit 701 according to an instruction from the main controller 211. The instruction is based on a user operation. The operation unit 204 transmits situation information selected by the user via the touch panel unit 701 to the main controller 211 via the I/O controller 215. The main controller 211 stores the situation information transmitted from the operation unit 204 in the dual I/F memory 219 via the I/O controller 215.

The situation information is information on the installation status of the image forming apparatus 101 such as "at factory assembly" 703, "at setting before installation" 704, and "in operation" 705. An operator selects the "at factory assembly" 703 if the image forming apparatus 101 is not yet shipped from the factory, the "at setting before installation" 704 if the setting of the image forming apparatus 101 is to be performed in accordance with the client environment, and the "in operation" 705 if the installation of the image forming apparatus 101 in the client environment is finished. The storage of the situation information in the dual I/F memory 219 is performed by the main controller 211 setting a flag in the dual I/F memory 219. The flag indicates the situation information.

Next, the selection of the situation by the operator will be described. If the apparatus is being assembled at the factory (before shipment), the operator selects the "at factory assembly" 703 as the situation. Further, if the setting which is to be performed before the apparatus is installed in the client environment is being performed, the operator selects the "at setting before installation" 704 as the situation. Furthermore, if the installation of the apparatus in the client environment is finished, the operator selects the "in operation" 705 as the situation.

The image forming apparatus 101 can determine its situation (i.e., installation status) according to the situation information (i.e., setting value of the installation status) selected and stored in this manner. Thus, information corresponding to the situation can be stored in the dual I/F memory 219. Further, access right to each area (each sector) of the dual I/F memory 219 where the information is stored can be set according to the situation.

The above-described situation information can also be transmitted from the mobile terminal 102 to the image forming apparatus 101 via the RF to be stored in the dual I/F memory 219.

Processing for limiting access to the dual I/F memory 219 will now be described with reference to FIGS. 8 to 11. FIGS. 8 to 11 are flowcharts illustrating processing procedures regarding storing information in the dual I/F memory 219 and limiting memory access according to the situation.

Figure 8:
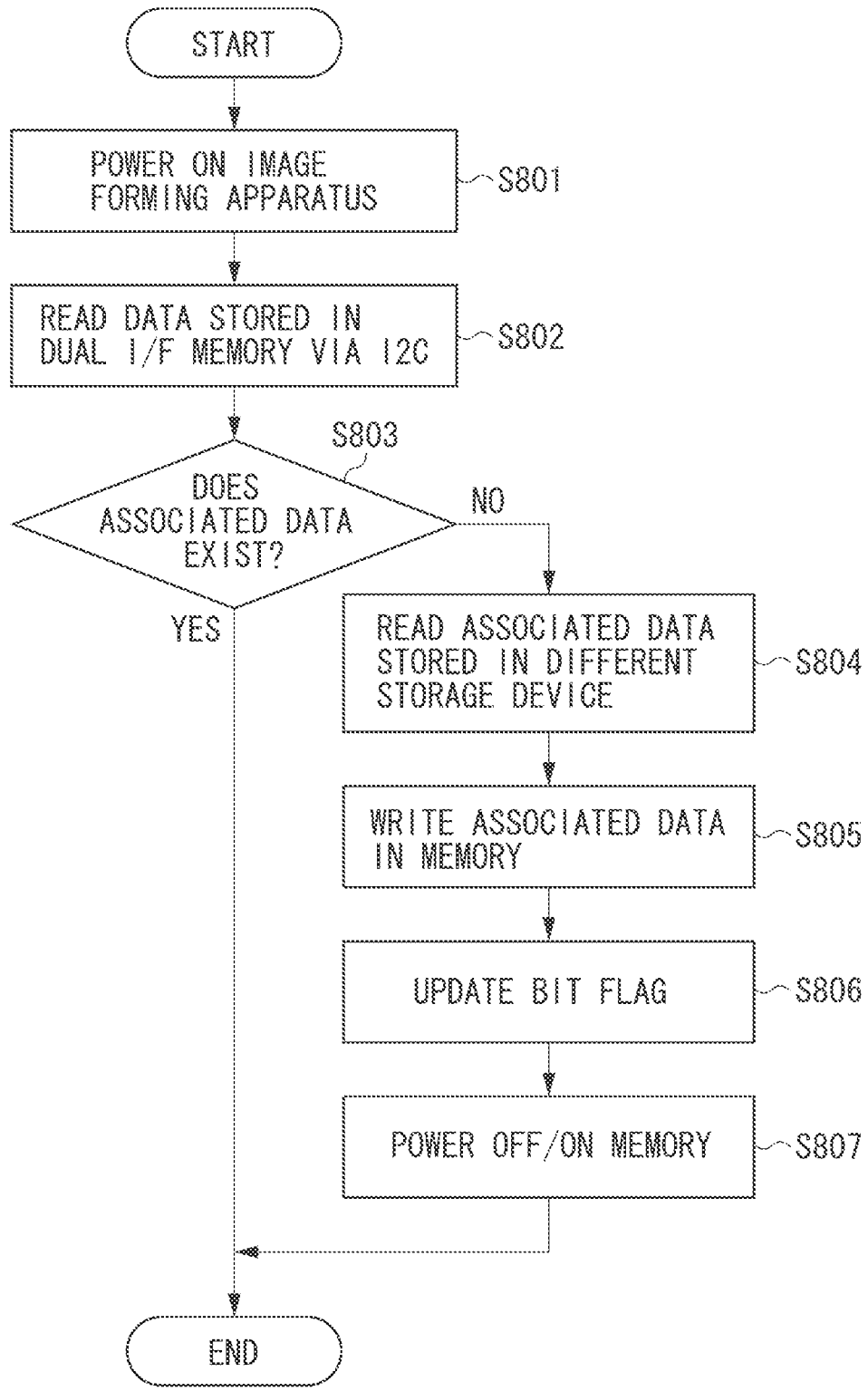
FIG. 8 is a flowchart illustrating processing procedures regarding storing information in the dual I/F memory and limiting memory access according to the situation.

FIG. 8 is a flowchart illustrating a procedure for storing specific data in the memory 303 in a read-only state on a one-time basis when the situation of the image forming apparatus 101 is set to the "at factory assembly" 703. The processing is executed by the main controller 211 when information unique to the image forming apparatus 101, such as a serial number, is stored in the memory 303. The processing of this flowchart is realized by the main controller 211 reading out a program, which is stored in the ROM 213 in a computer-readable state, and executing the program.

In step S801, if the image forming apparatus 101 having the situation set to the "at factory assembly" 703 is powered on, the main controller 211 detects that and the processing proceeds to step S802.

In step S802, the main controller 211 reads the data stored in the dual I/F memory 219 via the I/O controller 215. The data is read via the I2C interface.

In step S803, the main controller 211 determines whether associated data exists in the data read in step S802 described above. The associated data is, for example, information unique to each apparatus such as a serial number of the image forming apparatus 101. If the main controller 211 determines that the associated data exists (YES in step S803), the processing ends. If the main controller 211 determines that the associated data does not exist (NO in step S803), the processing proceeds to step S804.

In step S804, the main controller 211 reads the associated data stored in a different storage unit (e.g., the HDD 216, the RAM 212, or the ROM 213). In step S805, the main controller 211 writes the associated data read in step S804 in the dual I/F memory 219.

In step S806, the main controller 211 updates the bit flag in the dual I/F memory 219. According to the update of the bit flag, the bit flag of each sector illustrated in FIGS. 5B and 6B is updated. Regarding the flow illustrated in FIG. 8, the sector having the data written in step S805 is changed to "reading only". For example, if the above-described associated data is written in sector 0, the bit flag of the sector 0 in FIG. 5B is changed to "1" and the bit flag of the sector 0 in FIG. 6B is changed to "01". The main controller 211 may also change the bit flag of other sectors in FIG. 6B to "11" or "01" so that writing via the RF is disabled.

In step S807, the main controller 211 performs power off/on of the dual I/F memory 219 to enable the update of the bit flag performed in the above-described step S806. Then, the processing of the flowchart ends.

According to the above-described processing, when the situation of the image forming apparatus 101 is set to the "at factory assembly" 703, for example, specific data of the image forming apparatus 101, such as a serial number, can be stored in the dual I/F memory 219 in a read-only state on a one-time basis from both the I2C and the RF.

Next, processing executed by the main controller 211 of the image forming apparatus 101 having the situation set to the "in operation" 705 will be described with reference to FIG. 9. The processing is performed just before the image forming apparatus 101 is powered off.

Figure 9:
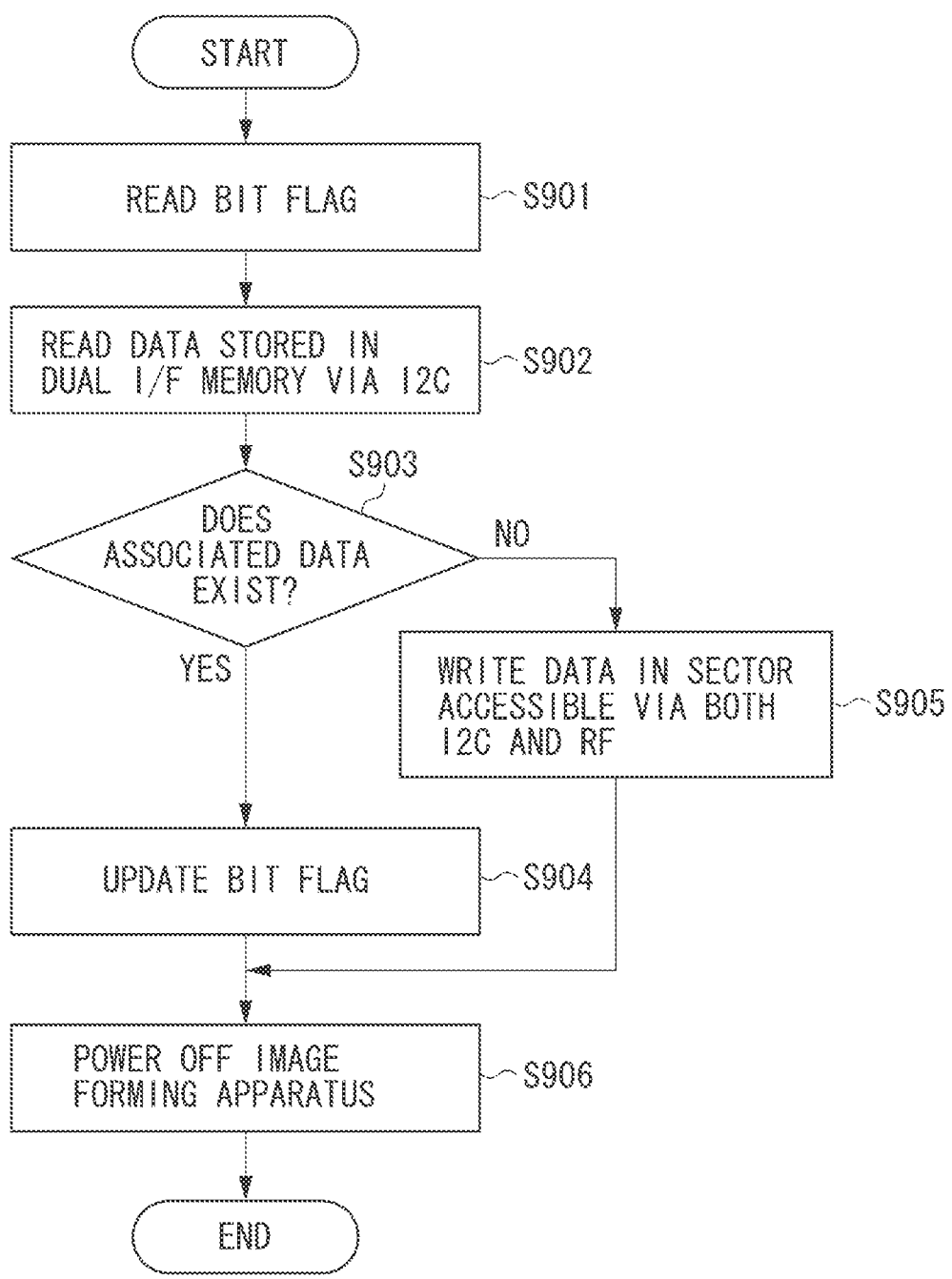
FIG. 9 is a flowchart illustrating a processing procedure regarding storing information in the dual I/F memory and limiting memory access according to the situation.

FIG. 9 is a flowchart regarding the image forming apparatus 101 having the situation set to the "in operation" 705. The processing procedure of the flowchart is executed by the main controller 211 just before the image forming apparatus 101 is powered off so that data can be read from the dual I/F memory 219 via the RF when the image forming apparatus 101 is powered off. The processing of this flowchart is realized by the main controller 211 reading out a program, which is stored in the ROM 213 in a computer-readable state, and executing the program.

In step S901, the main controller 211 reads the bit flag (see FIGS. 5B and 6B) of the dual I/F memory 219. In step S902, the main controller 211 reads the data stored in the dual I/F memory 219 via the I/O controller 215. The data is read via the I2C interface.

In step S903, the main controller 211 determines whether the associated data exists in the data read in step S902. The associated data, data which is read out via the RF when the apparatus is powered off, includes, for example, a serial number of the image forming apparatus 101, user information such as an address book and user settings, counter information, license information, error information, log information, and network setting information such as an IP address.

The above-described license information is license information on an application program installed in the image forming apparatus 101. Some application programs require setting of license information when installed in the image forming apparatus. This is to prevent unauthorized use. The license information is issued by a license server (not illustrated) when the image forming apparatus 101 accesses the license server using a serial number or a license code.

The type of data which is read via the RF when the image forming apparatus 101 is powered off may be set in advance or determined by the user via the operation unit 204 or the local network. Further, the data which is read via the RF when the image forming apparatus 101 is powered off can also be set via the RF.

In step S903, if the main controller 211 determines that the associated data exists (YES in step S903), the processing proceeds to step S904. In step S904, the main controller 211 updates the bit flag. The main controller 211 updates the bit flag regarding memory access via the RF to a sector in the dual I/F memory 219 where the above-described associated data exists. For example, if the associated data exists in the sector 0, the main controller 211 changes the bit flag of the sector 0 illustrated in FIG. 6B to "01" (i.e., reading via the RF is enabled but writing is disabled).

When the processing in step S904 is finished, the processing proceeds to step S906. In step S903, if the main controller 211 determines that the associated data does not exist (NO in step S903), the processing proceeds to step S905.

In step S905, the main controller 211 writes the associated data in the dual I/F memory 219. At that time, the main controller 211 writes the associated data in the sector which can be read from both the I2C and the RF. Whether reading is enabled from both the I2C and the RF is determined from the information on the bit flag read in step S901 described above. The main controller 211 may also write the associated data in the dual I/F memory 219 in a sector which cannot be read from both the I2C and the RF and then update the bit flag of the sector so that the associated data can be read from both the I2C and the RF.

When the above-described processing in step S904 is finished, the processing proceeds to step S906. In step S906, the image forming apparatus 101 is powered off by the main controller 211.

According to the above-described processing, when the installation of the image forming apparatus 101 in the client environment is finished, in other words, when the situation is the "in operation" 705, if the mobile terminal 102 is brought close to the dual I/F memory 219, specified data can be read out via the RF even if the image forming apparatus 101 is powered off. The specified data includes, for example, a serial number of the image forming apparatus 101, user information, counter information, license information, error information, log information, and network setting information such as an IP address.

Next, processing executed by the main controller 211 of the image forming apparatus 101 having the situation set to the "at setting before installation" 704 will be described with reference to FIG. 10. This processing is performed just before the image forming apparatus 101 is powered off.

Figure 10:
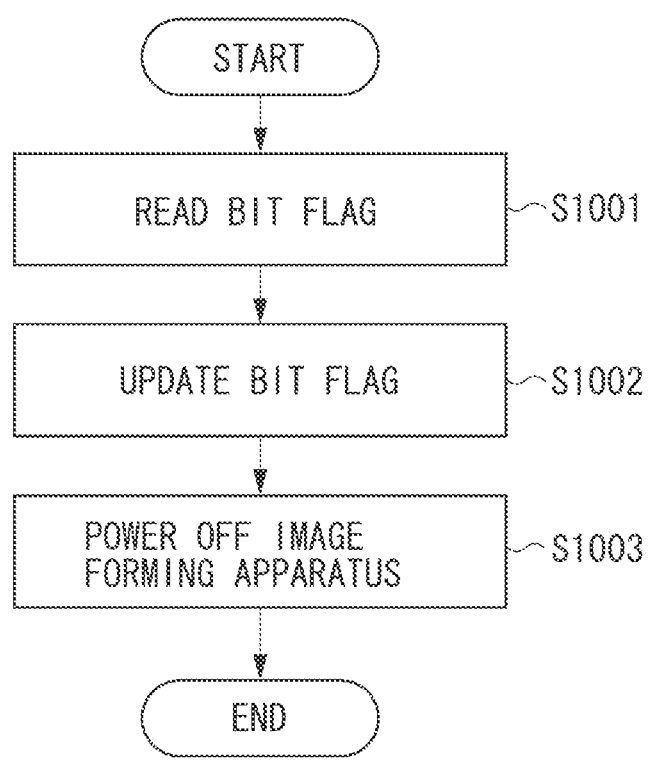
FIG. 10 is a flowchart illustrating a processing procedure regarding storing information in the dual I/F memory and limiting memory access according to the situation.

FIG. 10 is a flowchart regarding the image forming apparatus 101 having the situation set to the "at setting before installation" 704. The processing procedure of the flowchart is executed by the main controller 211 just before the image forming apparatus 101 is powered off so that data can be written in the dual I/F memory 219 via the RF when the image forming apparatus 101 is powered off. The processing of this flowchart is realized by the main controller 211 reading out a program, which is stored in the ROM 213 in a computer-readable state, and executing the program.

In step S1001, the main controller 211 reads the bit flag (see FIGS. 5B and 6B) of the dual I/F memory 219.

In step S1002, the main controller 211 updates the bit flag. By updating the bit flag of a specified sector in the dual I/F memory 219, the main controller 211 allows writing in the sector via the RF when the image forming apparatus 101 is powered off. For example, the main controller 211 allows writing in the sector 1 via the RF when the image forming apparatus 101 is powered off by changing the bit flag of the sector 1 in FIG. 6B to "10" (reading is disabled but writing is enabled) or "00" (both reading and writing are enabled).

For example, by the main controller 211 changing the bit flag of the sector where user information, license information, or network setting information such as an IP address is stored to "10" or "00", data of user information, license information, and network setting information such as an IP address can be written in the dual I/F memory 219 via the RF even if the image forming apparatus 101 is powered off.

When the above-described processing in step S1002 is finished, the processing proceeds to step S1003.

In step S1003, the main controller 211 turns off the power of the image forming apparatus 101.

As described above, regarding the image forming apparatus 101 having the situation set to the "at setting before installation" 704, the main controller 211 reserves an area in the dual I/F memory 219 where writing from an external device is enabled just before the image forming apparatus 101 is powered off.

According to the above-described processing, when the image forming apparatus 101 is set in the client environment, that is, when the situation is the "at setting before installation" 704, even if the image forming apparatus 101 is powered off, if the mobile terminal 102 is brought close to the dual I/F memory 219, data can be written in the dual I/F memory 219 via the RF. The data includes, for example, user information, license information, and network setting information such as an IP address.

Next, processing executed by the main controller 211 of the image forming apparatus 101 having the situation set to the "at setting before installation" 704 will be described with reference to FIG. 11. This processing is performed when the image forming apparatus 101 is powered on after data is written in the dual I/F memory 219 via the RF while the image forming apparatus 101 is powered off.

Figure 11:
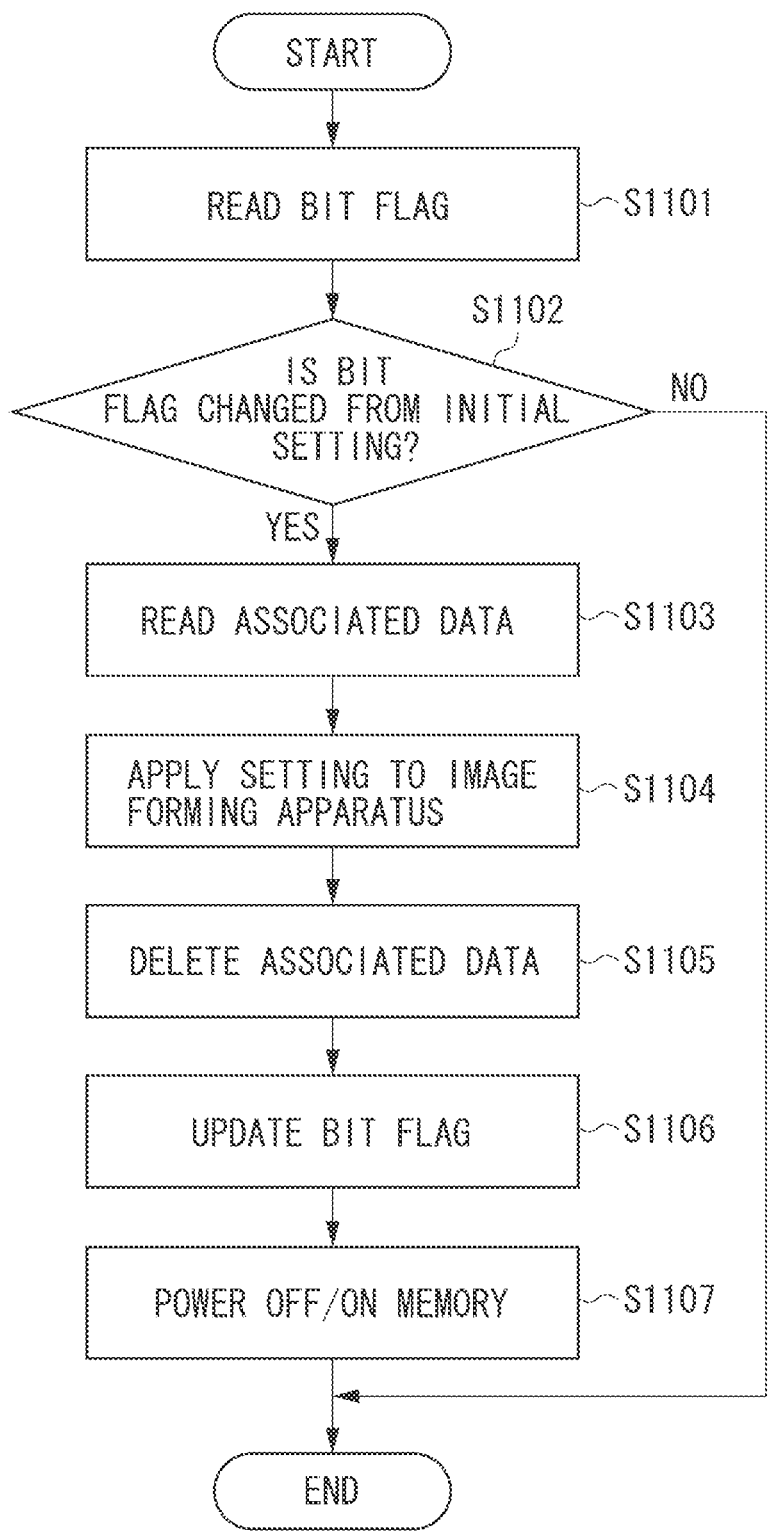
FIG. 11 is a flowchart illustrating a processing procedure regarding storing information in the dual I/F memory and limiting memory access according to the situation.

FIG. 11 is a flowchart regarding the image forming apparatus 101 having the situation set to the "at setting before installation" 704. The processing procedure of the flowchart are executed by the main controller 211 when the image forming apparatus 101 is started. The processing of this flowchart is realized by the main controller 211 reading out a program, which is stored in the ROM 213 in a computer-readable state, and executing the program.

In step S1101, if the image forming apparatus 101 is powered on, the main controller 211 reads the bit flag (see FIGS. 5B and 6B) of the dual I/F memory 219.

In step S1102, the main controller 211 determines whether the bit flag is changed from the initial setting (e.g., factory default setting). The initial setting is stored in the dual I/F memory 219, the HDD 216, or the ROM 213. If the bit flag is updated so that writing is performed via the RF in step S1002 in FIG. 10, then the bit flag is changed from the initial setting.

In step S1102, if the main controller 211 determines that the bit flag is not changed from the initial setting (NO in step S1102), then the processing of the flowchart ends. If the main controller 211 determines that the bit flag is changed from the initial setting (YES in step S1102), the processing proceeds to step S1103.

Although whether the bit flag is changed from the initial setting is determined in step S1102 in FIG. 11, this may be determined in a different manner. For example, whether a sector which can be written in via the RF, in other words, whether a sector with a bit flag value of "10" or "00" exists can be determined in step S1102. If such a sector exists, the processing in step S1103 is performed. If such a sector does not exist, then the processing ends.

In step S1103, the main controller 211 reads the associated data from the dual I/F memory 219. This associated data is data stored in the sector whose bit flag is changed from the initial setting. The data stored in the sector can be data written via the RF. In other words, the data read by the main controller 211 may be data written by, for example, a mobile terminal via the RF.

In step S1104, the main controller 211 applies the data acquired in the above-described step S1103 to various settings of the image forming apparatus 101. For example, the data is applied to the network setting and the software license management setting of the image forming apparatus 101.

In step S1105, the main controller 211 deletes the above-described associated data from the dual I/F memory 219. In step S1106, the main controller 211 updates the bit flag. The main controller 211 changes the setting of the bit flag of the dual I/F memory 219 to the initial setting so that similar processing is not re-executed when the image forming apparatus 101 is started the next time.

In step S1107, the main controller 211 performs power off/on of the dual I/F memory 219 to enable the update of the bit flag performed in the above-described step S1106. Then, the processing of the flowchart ends.

According to the above-described processing, if the image forming apparatus 101 is to be set in the client environment, in other words, if the situation is the "at setting before installation" 704, the image forming apparatus 101 can be set using the data written in the dual I/F memory 219 via the RF when the image forming apparatus 101 is powered off. The data includes, for example, user information, license information, or network setting information such as an IP address.

After the processing of the flowchart in FIG. 11 ends, the main controller 211 executes various types of start processing. Then an operating state is changed and the image forming apparatus 101 can perform the normal operation. According to the start processing, the setting is enabled even if the setting applied in step S1104 in FIG. 11 described above is a type of setting which is not enabled unless the main body of the image forming apparatus 101 is restarted (e.g., software license information, network setting such as an IP address).

Conventionally, when configuring such settings, a user needs to restart an image forming apparatus each time the setting is set. This is very inconvenient for the user and takes time. However, according to the present exemplary embodiment, the setting is enabled by storing the setting information in the dual I/F memory 219 via the RF in the image forming apparatus 101 in the power-off state and subsequently turning on the power of the image forming apparatus 101. Accordingly, the load of the setting operation and the setting time can be greatly reduced.

As described above, since the processing to be performed is selected from the processing described in FIGS. 8 to 11 according to the situation setting described with reference to FIG. 7, efficient processing of the image forming apparatus 101 can be performed.

For example, if the processing in FIG. 8 is performed when the image forming apparatus 101 is set at the situation of the "at factory assembly" 703, information unique to the image forming apparatus 101 can be automatically written in the dual I/F memory 219 at the first start-up of the image forming apparatus 101.

Further, if the processing in FIG. 9 is performed and operation log information is written in the dual I/F memory 219 when the image forming apparatus 101 is set at the situation of the "in operation" 705, the status of the image forming apparatus 101 can be checked from the mobile terminal 102.

Furthermore, if the processing in FIGS. 10 and 11 is performed when the image forming apparatus 101 is set at the situation of the "at setting before installation" 704, settings which require restart of the image forming apparatus 101 such as the network setting and the software license management setting of the image forming apparatus 101 can be effectively set by a single start of the image forming apparatus 101.

Although the processing illustrated in FIGS. 9 and 10 is described based on the assumption that the processing is executed just before the image forming apparatus 101 is powered off, such processing can be executed just before the mode of the image forming apparatus 101 is changed to the power saving mode (sleep state) or when an error occurs to the image forming apparatus 101. In such a case, the processing described above with reference to FIG. 11 is executed when the image forming apparatus 101 returns from the power saving mode (sleep state) or when the error state of the image forming apparatus 101 is recovered. In this manner, the image forming apparatus 101 according to the present exemplary embodiment stores information it uses in the dual I/F memory 219 on a plurality of occasions.

As described above, the image forming apparatus 101 according to the exemplary embodiment includes a storage unit, such as the dual I/F memory unit 218, which can be accessed by an external device by wireless communication even if the image forming apparatus 101 is powered off. By bringing the mobile terminal 102 close to the above-described storage unit of the image forming apparatus 101, apparatus information can be acquired from and setting information can be transferred to the image forming apparatus 101 in the power-off state via the RF according to the situation.

Embodiments of the present invention can also be achieved by supplying a software program storing computer-executable instructions (corresponding to the flowcharts shown in the drawings in the embodiments) for implementing the functions of the above-described embodiments to a system or apparatus directly or from a remote place, and allowing a computer of the system or apparatus to read out and execute the supplied program code.

Accordingly, the program code itself installed in the computer to implement the functional processing of the present invention by the computer may also implement aspects of the present invention. In other words, aspects of the present invention may include the computer program itself for implementing the functional processing of the present invention.

In this case, the program can take any form, for example, an object code, a program executed by an interpreter, or script data to be supplied to an OS, provided that the program has program functions.

Examples of a computer-readable storage medium for supplying the program may include, but are not limited to, a flexible disk, hard disk, optical disk, magneto-optical disk, MO, CD-ROM, CD-R, CD-RW, magnetic tape, nonvolatile memory card, ROM, and DVD, such as DVD-ROM or DVD-R.

The functions of the above-described embodiments may be implemented by executing the read-out program by a computer. In addition, the functions of the above-described embodiments may be implemented by allowing an OS running on the computer to perform part or the whole of actual processing based on the instructions of the program.

Furthermore, the functions of the above-described embodiments may be implemented by writing the program read out from the computer-readable storage medium in a memory provided for a function expansion board incorporated in the computer, or a function expansion unit connected to the computer. In other words, the functions of the embodiments may be implemented by allowing a CPU in the function expansion board or the function expansion unit to perform part or the whole of actual processing based on the instructions of the program.

While exemplary embodiments of the present invention has been described, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-191187 filed Sep. 2, 2011, which is hereby incorporated by reference herein in its entirety.

What is claimed is:

1. An image forming apparatus comprising:
   a central processing unit (CPU);
   a storage unit configured to be accessible from an external device even if the image forming apparatus is in a power off state;
   a setting unit configured to set information on an installation status of the image forming apparatus; and
   a control unit configured to, according to the information on the installation status set by the setting unit, enable writing, in the storage unit, of information corresponding to the information on the installation status from information used by the image forming apparatus at a plurality of timing points;
   wherein the information on the installation status includes information indicating a status before factory shipment, information indicating a status where setting is to be performed for a client environment, or information indicating a status where installation in the client environment is completed;
   wherein if the information on the installation status indicates the status where installation in the client environment is completed, the control unit enables writing, in the storage unit, of information including at least one among a serial number, error information, log information, counter information, license information on an application program installed in the image forming apparatus, and network setting information at a timing point lust before the image forming apparatus is powered off.

2. The image forming apparatus according to claim 1, wherein the information on the installation status includes information indicating a status before factory shipment, information indicating a status where setting is to be performed for a client environment, or information indicating a status where installation in the client environment is completed.

3. The image forming apparatus according to claim 1, wherein the plurality of timing points includes at least one among a timing point just before the image forming apparatus is powered off, a timing point when an error occurs to the image forming apparatus, a timing point just before an operating state of the image forming apparatus is switched to a sleep state, and a timing point the image forming apparatus is powered off.

4. The image forming apparatus according to claim 1, wherein information used by the image forming apparatus includes at least one among a serial number, error information, log information, counter information, license information on an application program installed in the image forming apparatus, and network setting information.

5. The image forming apparatus according to claim 1, wherein if the information on the installation status indicates the status where setting is to be performed for a client environment, the control unit enables setting of a storage area where writing from the external device is enabled, in the storage unit, at a timing point just before the image forming apparatus is powered off.

6. The image forming apparatus according to claim 5, wherein information written in the storage unit from the external device includes at least license information on an application program to be installed in the image forming apparatus or network setting information on the image forming apparatus.

7. The image forming apparatus according to claim 6, wherein if the information on the installation status indicates the status where setting is to be performed for a client environment, the control unit enables reading out, from the storage unit, of either the license information on the application program to be installed in the image forming apparatus or the network setting information on the image forming apparatus to apply the information to the image forming apparatus at a timing point the image forming apparatus is powered on.

8. The image forming apparatus according to claim 1, wherein the control unit sets an access right for each storage area of the storage unit.

9. The image forming apparatus according to claim 8, wherein the control unit sets the access right from inside of the image forming apparatus and the access right from the external device for each storage area of the storage unit.

10. The image forming apparatus according to claim 1, wherein the storage unit includes two interfaces being a passive RFID and a bus.

11. A method for controlling an image forming apparatus including a storage unit accessible from an external device even if the image forming apparatus is powered off, the method comprising:
- setting information on an installation status of the image forming apparatus according to an installation status selecting operation of the image forming apparatus performed by a user, and
- writing, according to the information on the set installation status, in the storage unit, information corresponding to the information on the installation status from information used by the image forming apparatus at a plurality of timing points;
- wherein the information on the installation status includes information indicating a status before factory shipment, information indicating a status where setting is to be performed for a client environment, or information indicating a status where installation in the client environment is completed;
- wherein if the information on the installation status indicates the status where installation in the client environment is completed, the control unit enables writing, in the storage unit, of information including at least one among a serial number, error information, log information, counter information, license information on an application program installed in the image forming apparatus, and network setting information at a timing point lust before the image forming apparatus is powered off.

12. A non-transitory computer-readable storage medium storing a program that causes a computer to execute a method for controlling an image forming apparatus, wherein the image forming apparatus includes a storage unit accessible from an external device even if the image forming apparatus is powered off, the method comprising:
- setting information on an installation status of the image forming apparatus according to an installation status selecting operation of the image forming apparatus performed by a user, and
- writing, according to the information on the set installation status, in the storage unit, information corresponding to the information on the installation status from information used by the image forming apparatus at a plurality of timing points;
- wherein the information on the installation status includes information indicating a status before factory shipment, information indicating a status where setting is to be performed for a client environment, or information indicating a status where installation in the client environment is completed;
- wherein if the information on the installation status indicates the status where installation in the client environment is completed, the control unit enables writing, in the storage unit, of information including at least one among a serial number, error information, log information, counter information, license information on an application program installed in the image forming apparatus, and network setting information at a timing point lust before the image forming apparatus is powered off.

* * * * *